Figure 1:
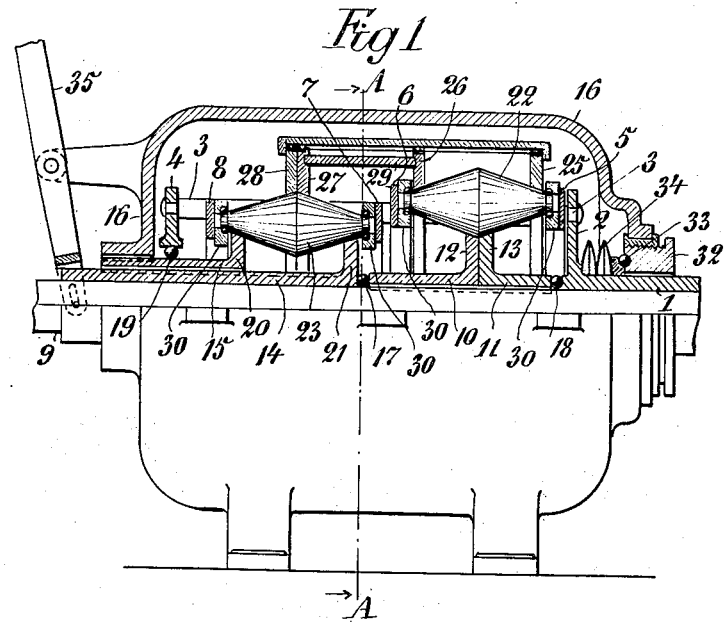

J. C. MARTINS.
VARIABLE SPEED FRICTION GEARING.
APPLICATION FILED SEPT. 27, 1913.

1,112,711.

Patented Oct. 6, 1914.
2 SHEETS—SHEET 1.

Witnesses
P. I. Hulsizer
C. H. Potter

Inventor
Jens Christian Martins
by Byrnes Townsend Brickenstein
Attys.

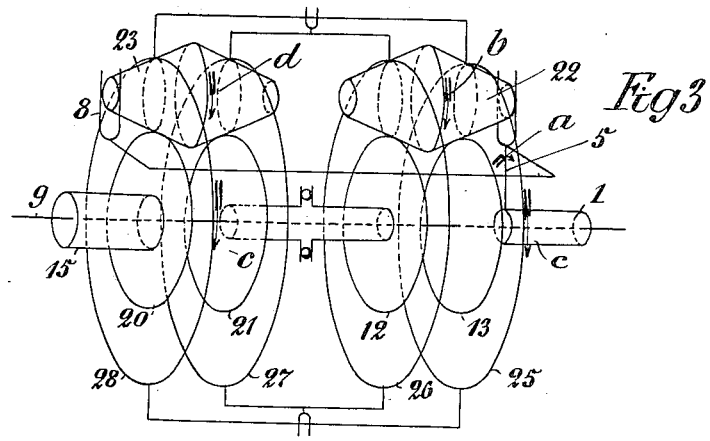
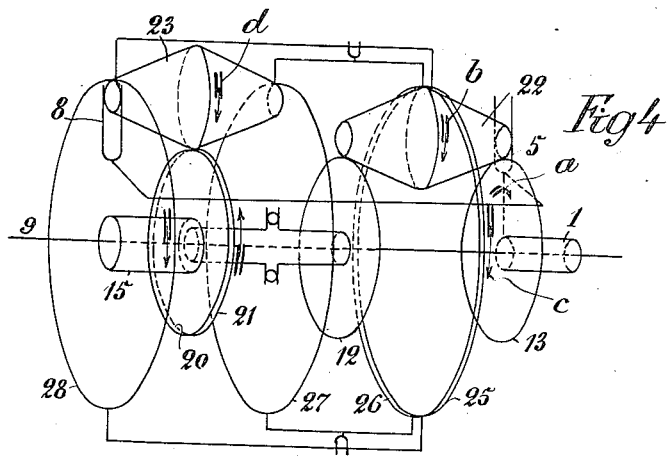
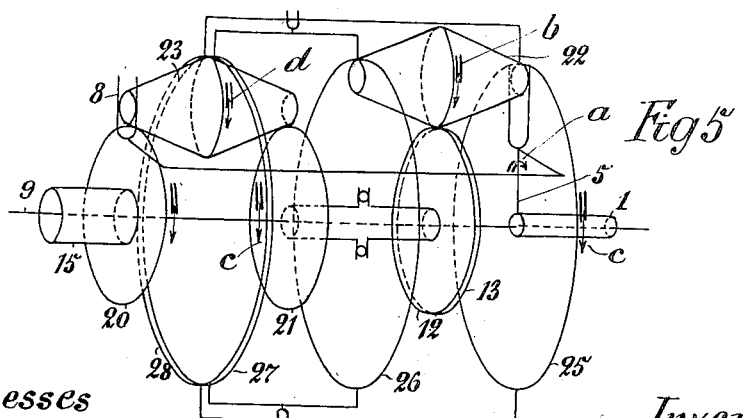

UNITED STATES PATENT OFFICE.

JENS CHRISTIAN MARTINS, OF COPENHAGEN, DENMARK, ASSIGNOR TO TRANSMISSION AKTS., OF COPENHAGEN, DENMARK.

VARIABLE-SPEED FRICTION-GEARING.

1,112,711.   Specification of Letters Patent.   Patented Oct. 6, 1914.

Application filed September 27, 1913. Serial No. 792,179.

*To all whom it may concern:*

Be it known that I, JENS CHRISTIAN MARTINS, a subject of the King of Denmark, residing at Copenhagen, Denmark, have invented certain new and useful Improvements in Variable-Speed Friction-Gearing, of which the following is a specification.

Friction gearing comprising two sets of double conical bodies, acting as planet wheels, which bodies roll on one side on the outer circumference of flanges or disks and, on the other side, on the inner edge of rings, against which flanges and rings they are pressed at a suitable pressure, are known. In such apparatus alteration of speed is obtained by displacing some or all of the said parts in relation to each other in the longitudinal direction of the double conical bodies, so that these latter are caused to roll with various diameters on the said flanges and rings.

The present invention relates to apparatus of this kind and aims at producing a gearing, in which reversal and idle running can be effected only by a displacement as described above and without employment of couplings of any kind. This is obtained according to the present invention by connecting the planet wheel carriers in such a gearing together and with one of the shafts of the apparatus, and by arranging one set of the flanges as stationary while the other set of the said flanges is connected with the other shaft of the apparatus. By such an arrangement of the parts a certain mutual position of the said rings and shafts exists, as will be described below, in which the driven shaft of the apparatus will become stationary, and when the parts are displaced in one direction from this position the shafts of the apparatus will be turned in the same direction, while through displacement in the opposite direction from the neutral position they will be turned in opposite directions. The speed obtained is in both cases contingent on the degree of displacement of the parts in question from the said neutral position.

One construction of the invention is shown in the drawing, in which—

Figure 2:
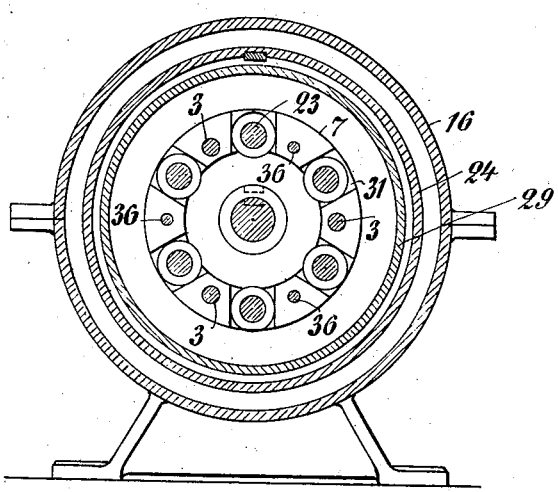

Figure 1 is a partial longitudinal section of a system of gearing according to the present invention; Fig. 2 a transverse section on the line A—A, Fig. 1; and Figs. 3 to 5 are diagrammatical views illustrating various mutual positions which can be assumed by the parts of the apparatus.

The power is transmitted to the hollow shaft 1 of the apparatus, carrying the flange 2 which by means of bolts 3 is connected with the circular disk 4. The bolts 3 serve for carrying around the rings 5, 6, 7 and 8 forming the planet wheel carriers, the said rings being longitudinally displaceable on the bolts. The bolts 36 serve for keeping two sets of rings 5—6 and 7—8 forming the planet wheel carriers at the correct mutual distance. The power is transmitted from the driving shaft 1 through the speed-changing mechanism to a driven shaft 9, to which the bushings 10 and 11 carrying the flanges 12 and 13 are non-rotatably but longitudinally displaceably connected through a key and groove. On the shaft 9 is further arranged the bushing 14 which through key 75 and groove is made non-turnable in relation to the bushing 15, which is keyed to the stationary casing 16 of the apparatus. The thrust ball bearing 17 is arranged between the bushings 10 and 14 and the ball bearing 18 between the bushing 11 and the hollow shaft 1. The circular disk 4 is by the ball bearing 19 supported on the stationary bushing 15. The bushings 14 and 15 carry the flanges 20 and 21 on which roll the double conical bodies 23, while the double conical bodies 22 roll on the flanges 12 and 13. The cylindrical body 24 is by key and groove connected with rings 26 and 27 arranged inside the same, while the rings 25 and 28 are keyed to the same. The rings 26 and 27 are kept at the correct mutual distance by means of the cylindrical body 29. The double conical bodies 22 and 23 rest in ball bearings 30 guided in grooves 31, Fig. 2, in the rings 5, 6, 7 and 8 forming the planet wheel carriers. A suitable pressure between the various parts of the system is obtained by turning the nut 32, Fig. 1, which through the ball bearing 33 presses the Belleville spring-washer 34, which supports the flange 2. The adjustment of the apparatus to forward movement, idle running, or backward movement is effected through displacement of the bushing 14 by means of the lever 35.

The operation of the apparatus is as follows: The power is transmitted to the hollow shaft 1 and from thence through the flange 2 and the bolts 3 to the planet wheel carriers 5—6 and 7—8. When the planet wheel carriers are rotated the double conical bodies 23 will roll on the stationary flanges 20 and 21, and thereby the rings 27 and 28, thus also the rings 25 and 26 will be rotated in the same direction as the planet wheel carrier.

Referring now to Figs. 3-5, explanation will be given as to how the double conical bodies 22, following the planet wheel carriers during the rotating of the same and rolling on the rings 25 and 26 and on the flanges 12 and 13, will be able to turn these latter in one or the other direction of revolution or will eventually cause the same to stand still, dependent on the position of rings and flanges in relation to the double conical bodies. In the diagrammatical Figs. 3-5 only one of the double conical bodies of each set is shown for the sake of clearness, while rings, flanges and planet wheel carriers are only indicated by lines, which are designated by the same reference numbers as the members in Figs. 1 and 2, which they are meant to represent. The directions of revolution of the various organs are indicated by means of arrows.

If by means of the lever 35 the bushing 14 is displaced and therewith the flanges 21 and 12 to such a position that the flanges and the outer rings are caused to roll on the same diameter of the double conical bodies, which takes place simultaneously for both systems, the parts will assume the position shown diagrammatically in Fig. 3. If the planet wheel carriers 5 and 8, which as described are both firmly connected with the hollow shaft 1, be turned in the direction indicated by the arrow, the double conical bodies 23 will roll on the stationary flanges 20 and 21. The bodies 23 are thereby forced to rotate on their own axes in the direction of the arrow $d$ besides following the rotation of the planet wheel carrier. The rings 27 and 28 will thereby be rotated in the direction indicated by the arrow $c$ at a speed which is dependent partly on the speed of the rings 25 and 26 and partly on the speed of the planet wheel carrier 5. As the planet wheel carriers 5 and 8 as above described are mechanically connected and are thus rotated at the same speed, it will result that the speed received by the flanges 12 and 13 will be *nil*, as the flanges 20 and 21 are stationary, and the two systems are symmetrical. The shaft 9 connected with the flanges 12 and 13 will thus remain stationary, and the described position of the parts corresponds to idle running.

If the parts are displaced by means of the lever 35, so as to assume the position shown in Fig. 4, both of the shafts 1 and 9 will be turned in the same direction. As it will be seen the double conical bodies 23 here roll with their largest diameter on the flanges 20 and 21 and with their smallest diameter in the rings 27 and 28, while the double conical bodies 22 on the contrary roll with their smallest diameter on the circumference of the flanges 12 and 13 and with their largest diameter in the rings 25 and 26. If the planet wheel carriers are rotated in the same direction and at the same speed as in the previous case, the double conical bodies 23 will by rolling on the stationary flanges 20 and 21 be caused to rotate on their own axes at a smaller speed than in the above described case, as they now roll with a larger diameter on the said flanges. The speed transmitted to the rings 27 and 28 by the bodies will therefore be smaller than in the above named case, the double conical bodies 23 rolling with a smaller diameter in the rings 27 and 28. The rings 25 and 26 will therefore impart a smaller speed of rotation on their axes to the bodies 22 than in the above named case, partly owing to the smaller speed of the rings and partly owing to the same rolling with a larger diameter of the double conical bodies 22. These latter roll with their smallest diameter on the flanges 12 and 13, and as the planet wheel carrier is rotated at the same speed as in the above case, the flanges 12 and 13 will be carried along with them, as owing to the slow rotation of the bodies 22, by the rings 25 and 26, these flanges 12 and 13 will be but very slightly impeded.

If the parts by means of the lever 35 are displaced to the position shown in Fig. 5, and the planet wheel carrier continuously rotated at the same speed and in the same direction as hitherto, the double conical bodies 23 will by rolling with the smallest diameter on the stationary flanges 20 and 21 rotate at the greatest possible speed on their own axes. As they roll with their greatest diameters in the rings 27 and 28, the latter and consequently also the rings 25 and 26 will rotate at the greatest possible speed. As the double conical bodies abut against the inner surfaces of the rings 25 and 26 with their smallest diameters, they will be caused to rotate on their axes at the greatest possible speed, and as they roll on the flanges 12 and 13 with their largest diameters, they will impart the latter with a speed in the backward direction which is greater than that at which the planet carriers are turned forward. The result will thus be that the flanges 12 and 13 and with these the shaft 9 will be rotated in a direction opposite to that in which the shaft 1 is rotated.

Figs. 4 and 5 show the extreme positions, which can be assumed by the parts of the apparatus by displacement to one or the other side in relation to the neutral middle position shown in Fig. 3. It is obvious that intermediate positions will correspond to intermediate values of the speed of gearing in one and the other direction of rotation.

An apparatus such as the one described can advantageously be used on almost every occasion where it is desired to transmit the power from an engine to a working machine at different speeds, and where idle running and reversal is desirable. The apparatus can also be applied to tool machines, automobiles, motor-launches and the like.

Having now particularly described my invention what I claim and desire to secure by Letters Patent is:

A friction-gearing comprising a fixed casing, a driving-shaft, a planet-wheel carrier arranged to rotate therewith, two sets of double conical bodies acting as planet-wheels, two sets of outer rings non-rotatably connected with each other, a set of flanges non-rotatably connected with said casing, a driven-shaft, a set of flanges non-rotatably arranged thereon, means for producing frictional contact between the double conical bodies and said flanges and rings, and means for effecting displacement of said flanges and rings longitudinally of said double conical bodies.

In testimony whereof I have hereunto set my hand in presence of two subscribing witnesses.

JENS CHRISTIAN MARTINS.

Witnesses:
  VIGGO BLOM,
  CECIL VILHELM SCHORD.